UNITED STATES PATENT OFFICE.

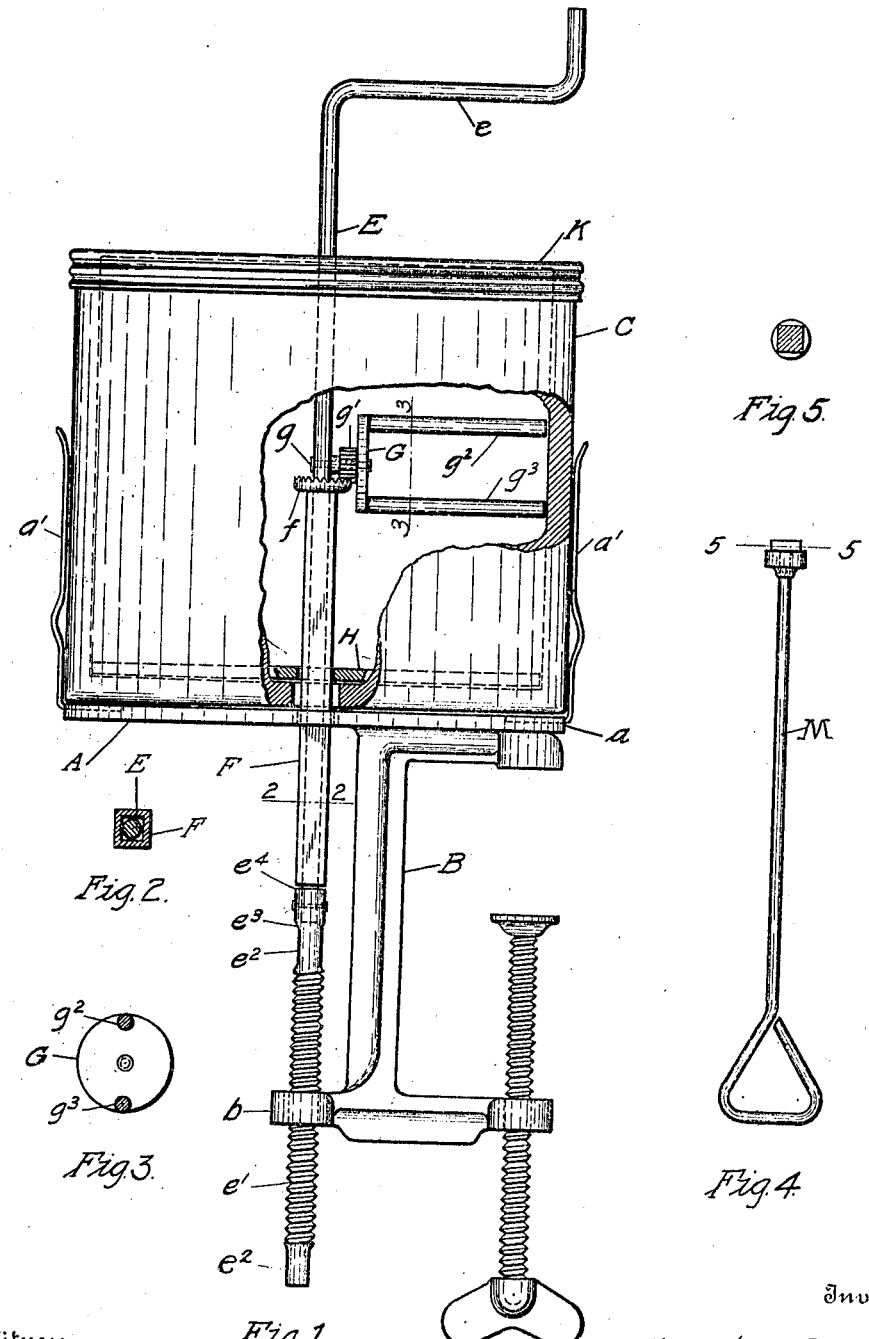

HOWARD E. BOATH, OF NORWOOD, OHIO.

DEVICE FOR STIRRING VISCOUS MATERIALS.

1,298,651. Specification of Letters Patent. Patented Apr. 1, 1919.

Application filed December 9, 1918. Serial No. 265,829.

*To all whom it may concern:*

Be it known that I, HOWARD E. BOATH, a citizen of the United States of America, and a resident of Norwood, in the county of Hamilton and State of Ohio, have invented a new and useful Improvement in Devices for Stirring Viscous Materials, of which the following is a specification.

The object of my invention is a device for stirring viscous material thoroughly and uniformly.

My invention relates to devices for mixing a coloring material through oleomargarin, but is not limited to such use.

In the accompanying drawing:

Figure 1 is a view partly in side elevation and partly in sectional elevation of a stirring device embodying my invention.

Fig. 2, is a sectional view taken upon line 2—2 of Fig. 1.

Fig. 3, is a sectional view taken upon line 3—3 of Fig. 1.

Fig. 4, is a side elevation of a handle used in compacting the oleomargarin that has been stirred.

Fig. 5, is a sectional view taken upon line 5—5 of Fig. 4.

The stirring device of my invention comprises a holder A, which clamps upon a table or shelf by means of a clamp B, to hold the receptacle in which the viscous material is to be placed, to be stirred by means of a stirrer when the handle $e$, is turned.

The holder A, has a base portion $a$, from which spring arms $a^1$—$a^1$, project upward to engage the exterior of the receptacle C, which is of cylindrical shape, and of uniform diameter. The stirrer comprises a drive shaft E, which at its lower end is secured to or formed integral with a screw threaded portion $e^1$, which passes through a lug $b$, upon the clamp B. The lug has an internal bore of the diameter of the screw thread $e^1$, and has internal screw threads to engage the portion of the screw thread $e^1$. Adjacent to the screw threaded portion there is a reduced portion $e^2$, of the shaft, which can pass through the bore in the lug without contacting with the screw thread thereof. Adjacent to the reduced portion $e^2$, is a shoulder $e^3$, which has a larger diameter than the bore in lug $b$. Between the upper part of the drive shaft E, and the lower part, is a shoulder $e^4$, upon which seats the lower end of a sleeve F, which has at its upper end a gear wheel $f$. Sleeve F, is rectangular in cross section, and passes snugly through a square hole in the base $a$, so that its engagement with the base prevents the sleeve from rotating.

The internal bore of the sleeve F, is such as to permit of a free rotation of the shaft E, therein. Adjacent to the upper end of the sleeve F, shaft E, has passing through it a pin $g$, upon which is journaled a mixer, which comprises a disk G, secured to which and mounted upon $g$, is a pinion $g^1$, which meshes with the teeth of the gear wheel $f$. The ratio of the number of the teeth upon $g^1$, to the number of teeth upon $f$, is odd, so that upon a revolution of the mixer G, about the driving shaft E, the relative position of the pins $g^2$, $g^3$, to their position upon the preceding revolution will be changed. Pins $g^2$, $g^3$, project horizontally from disk G, and are of a length such that their outer ends are adjacent to the internal surface of cylinder C. Within the cylinder G, is a circular plate H, which rests upon the bottom of the cylinder, and has a central bore which fits the sleeve F, snugly. Cylinder C, has secured upon it a removable cover K, which has a central perforation to pass the shaft E.

In operation the device having been mounted upon a table or shelf, by means of its clamp B, the viscous material is placed in the receptacle C, together with the substance which is to be mixed with it, for instance if the viscous material be oleomargarin, it is placed in the receptacle C, with the coloring material which is to be incorporated with it. The lid K, is secured in place, and the handle $e$, is rotated. This causes a vertical motion as well as a rotating motion to be imparted to the mixer G. The vertical motion is due to the movement of screw thread $e^1$, through the lug $b$, and the rotating motion is imparted by the engagement of the gear wheel with the pinion $g^1$.

By reason of the odd ratio of the teeth of the pinion $g^1$, to the teeth of the gear wheel $f$, the relative position of the pins $g^2$, $g^3$, in each revolution changes from that of their position in the previous revolution. This causes the mixer to agitate every particle of the viscous material and to secure a uniform distribution of the coloring or other material through the oleomargarin or other viscous material.

When the mixer G, in its vertical movement approaches the bottom or top of the receptacle, the reduced portion $e^2$, of the shaft enters the lug $b$. Then the continued rotation of the shaft E, ceases to reciprocate the mixer G, but continues to impart a rotating motion to it, so that the disk G, rides upon the plate H, or cover K, and the pins $g^2$, $g^3$, in their revolution approach close to said plate or said cover and by the continuous rotation of the disk G, thoroughly stirs the oleaginous substance near the bottom or top of the receptacle.

When the coloring has been uniformly distributed through the viscous or oleaginous material, cover K, is removed and the shaft E, carrying with it the mixer G, is removed from the cylinder C. Then the receptacle is inverted upon a dish and the reduced end of the handle M, is inserted in the center hole in plate H, and the oleaginous material is compacted and molded to a cylindrical shape by compressing the material between the plate H, the dish and the cylinder. Then by raising the cylinder from the dish and pushing downward upon the handle the oleomargarin is ejected onto the dish in a neatly compacted and molded cylindrical form.

What I claim is:—

1. In a device for stirring viscous materials the combination of a receptacle, a longitudinal shaft upon the interior of the receptacle, a mixing device mounted reciprocally and rotatively upon the drive shaft, and means for converting a rotating motion of the drive shaft into a reciprocating and rotating motion of the mixing device.

2. In a device for stirring viscous materials the combination of a receptacle, a longitudinal shaft upon the interior of the receptacle, a mixing device mounted reciprocally and rotatively upon the drive shaft, and means for converting a rotating motion of the drive shaft into a reciprocating and rotating motion and means for eliminating the reciprocating motion while retaining the rotating motion of the mixer when it reaches the bottom of the receptacle.

3. A stirring device comprising a driving shaft having a screw threaded portion, a fixed internally screw threaded lug engaging the threads of the drive shaft, a sleeve through which the drive shaft passes, a gear wheel secured upon the inner end of the sleeve, a pin secured transversely to the drive shaft, and a mixer comprising a disk mounted rotatively upon the pin having secured to it a pinion which meshes with the gear wheel and transverse fingers projecting outwardly from the disk.

4. A stirring device comprising a driving shaft having a screw threaded portion and a smooth portion of reduced diameter, and a lug having an internal bore with screw threads adapted to engage the threads of the shaft and to pass the reduced portion thereof, a fixed gear wheel through which the driving shaft passes, and a mixer comprising a disk mounted rotatively upon the drive shaft and having secured to it a pinion which meshes with the gear wheel and transverse fingers projecting outwardly from the disk.

In testimony whereof, I have hereunto subscribed my name this 7th day of December, 1918.

HOWARD E. BOATH.

Copies of this patent may be obtained for five cents each, by addressing the "Commissioner of Patents, Washington, D. C."